US006917170B2

(12) United States Patent
Terakawa et al.

(10) Patent No.: US 6,917,170 B2
(45) Date of Patent: Jul. 12, 2005

(54) POWER WINDOW APPARATUS

(75) Inventors: Katsutoshi Terakawa, Niwa-gun (JP); Satoshi Sugimoto, Niwa-gun (JP); Tomohiro Igawa, Niwa-gun (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 10/829,500

(22) Filed: Apr. 22, 2004

(65) Prior Publication Data

US 2004/0212339 A1 Oct. 28, 2004

(30) Foreign Application Priority Data

Apr. 25, 2003 (JP) ....................................... 2003-121855

(51) Int. Cl.[7] .................................................. H02P 1/00

(52) U.S. Cl. ....................... 318/282; 318/280; 318/265; 318/266; 318/286; 324/537; 49/26; 49/28

(58) Field of Search ................................ 318/280–283, 318/286, 265–266, 443, 445; 324/537; 49/26, 28

(56) References Cited

U.S. PATENT DOCUMENTS 4,575,662 A * 3/1986 Lehnhoff .................... 318/282
6,072,290 A * 6/2000 Takagi et al. ............... 318/283
6,081,085 A * 6/2000 Ohashi et al. .............. 318/283
6,369,556 B1 * 4/2002 Ohshima ..................... 323/282
6,404,155 B1 * 6/2002 Funayama et al. .......... 318/293
6,680,618 B1 * 1/2004 Otani et al. .................. 324/693
6,724,164 B2 * 4/2004 Shimizu et al. ............. 318/282

FOREIGN PATENT DOCUMENTS

JP 2002-013964 1/2002 ........... G01F/23/24

* cited by examiner

*Primary Examiner*—Rina Duda
(74) *Attorney, Agent, or Firm*—Mark D. Simpson; Synnestvedt & Lechner LLP

(57) ABSTRACT

A power window apparatus that inhibits leakage current when submerged in water. The power window apparatus includes an operation switch. A microcomputer controls a motor. A connector has a down terminal and an up terminal connecting the operation switch and the microcomputer, and a ground terminal used to connect the operation switch and the ground. When operated, the operation switch connects the down terminal or the up terminal to the ground terminal and generates a low-level input signal in the down terminal or in the up terminal. The microcomputer drives the motor in response to the low-level input signal. An inhibition mechanism arranged in the connector inhibits, when water enters into the connector, a leakage current from flowing between a connecting terminal and a ground terminal.

19 Claims, 4 Drawing Sheets

POWER WINDOW APPARATUS

BACKGROUND OF THE INVENTION

The present invention relates to a power window apparatus, and more particularly, to a power window apparatus in which a switch board and a control board are connected via a connector.

In recent years, various motors have been mounted on vehicles to improve convenience. For example, a power window apparatus, which raises and lowers a window glass with a direct current (DC) motor, is mounted on many vehicles. In the power window apparatus, an operation switch is first operated by an operator, so that a motor electronic control unit (motor ECU), which is electrically connected to the operation switch, controls the motor according to an input signal from the operation switch. Torque produced by the motor is then transmitted to the window glass via a mechanical structure, to raise or lower the window glass.

In such a power window apparatus, a board on which the motor ECU is mounted (motor controller) may have a waterproof structure shown, for example, in Japanese Laid-Open Patent Publication No. 2002-13964, to prevent water entry when the vehicle is submerged in water.

In some power window apparatus, a board, on which an operation switch (switch unit) is mounted, and a motor controller are connected via a connector. In a power window apparatus where the connector is arranged on the board of the switch unit, however, the connected parts of the connector and the switch unit often do not have a waterproof structure. If this power window apparatus is submerged in water, water enters into the connected parts of the connector and the switch unit. Such water entry causes leakage current to flow between terminals of the connector. The leakage current may cause the motor ECU to incorrectly recognize its input signal. Particularly, when the motor ECU drives the motor to raise or lower the window glass in response to a low-level input signal (active-low control), the motor ECU may incorrectly recognize its input signal due to water entry.

In more detail, to maintain its input signal at a high-level when the operation switch is not closed, for example, a pull-up resistor is connected to each input terminal of the motor ECU. When, for example, this power window apparatus is submerged in water, water enters into the connected parts of the connector and the switch unit. If this happens, leakage current flows between a terminal for an input signal and a ground terminal. The resistance of a leakage resistor between the two terminals is smaller than the resistance of the pull-up resistor connected to the input terminal. When a leakage current flows, therefore, the motor ECU detects a low-level potential like when the operation switch is closed. This causes the motor ECU to incorrectly recognize that the operation switch is closed when the operation switch is not operated.

SUMMARY OF THE INVENTION

The present invention provides a power window apparatus that inhibits leakage current when submerged in water.

The prevent invention provides a power window apparatus for moving a window glass of a vehicle by driving an actuator. The power window apparatus includes a switch operated to cause the window glass to move. A control unit controls the actuator. A connector has a connecting terminal connecting the switch and the control unit. The connector has a ground terminal used to connect the switch to ground. The switch connects the connecting terminal and the ground terminal to each other and generates a switch signal having a ground level at the connecting terminal when the switch is operated. The control unit drives the actuator in response to the switch signal having the ground level. An inhibiting means arranged in the connector inhibits leakage current from flowing between the connecting terminal and the ground terminal when the connector is submerged in water.

A further aspect of the present invention is a power window apparatus for moving a window glass of a vehicle by driving an actuator. The power window apparatus is connected to a power supply. The power window apparatus includes a switch operated for generating a switch signal to cause the window glass to move. A control unit controls the actuator. The control unit includes an input terminal that is provided with the switch signal. A resistor is connected between the power supply and the input terminal of the control unit. A connector has a connecting terminal connecting the switch and the input terminal of the control unit. The connector has a ground terminal used to connect the switch to ground. The switch connects the connecting terminal and the ground terminal to each other and generates a switch signal having a ground level at the connecting terminal when the switch is operated. The control unit drives the actuator in response to the switch signal having the ground level. The connector includes a power supply terminal connected to the power supply and arranged between the connecting terminal and the ground terminal.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A power window apparatus 1 according to a preferred embodiment of the present invention will now be described with reference to FIGS. 1 to 5.

Figure 1:
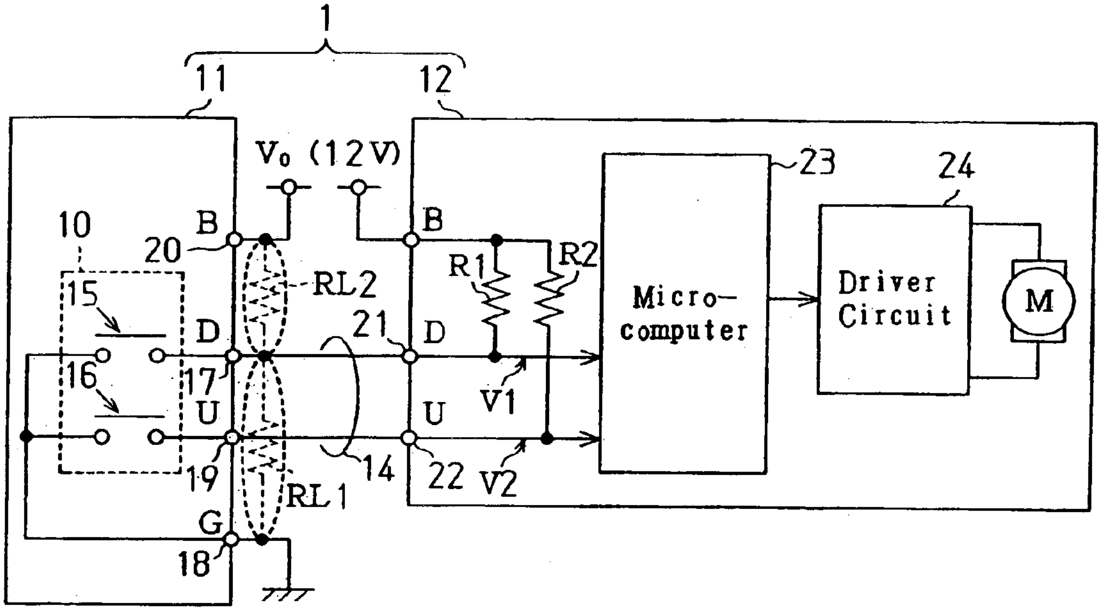
FIG. 1 is a schematic block diagram of a power window apparatus according to a preferred embodiment of the present invention.
Figure 2:
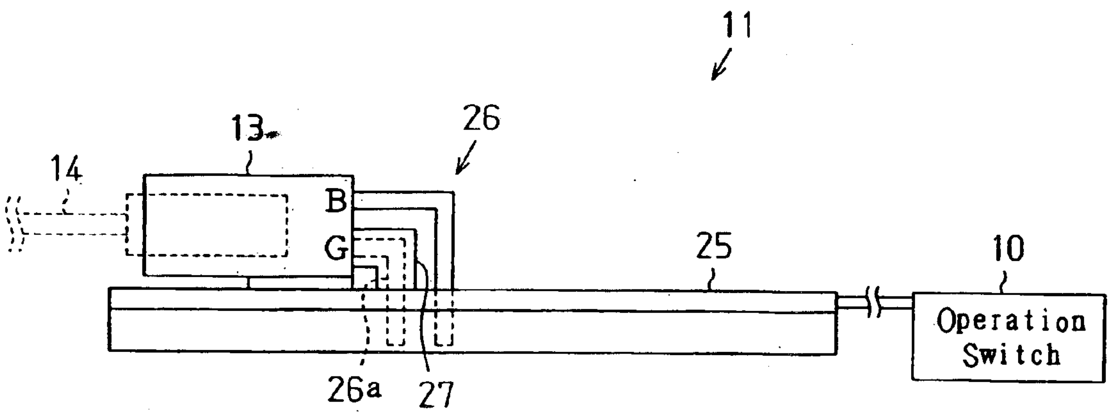
FIG. 2 is a side view of a switch board included in the power window apparatus of FIG. 1.
Figure 3:
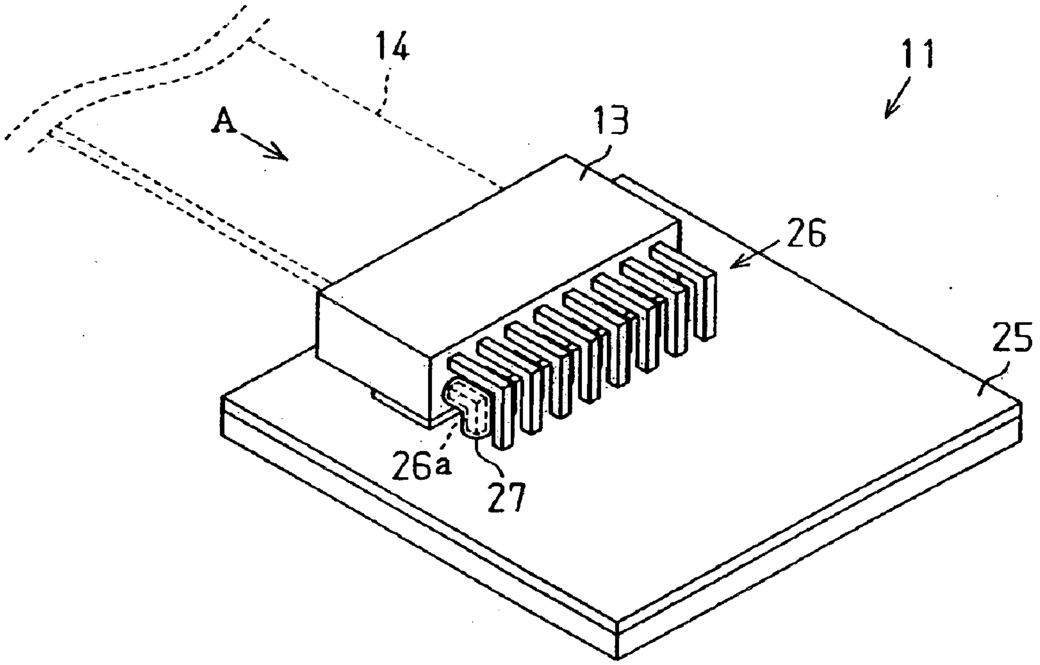
FIG. 3 is a perspective view of the switch board included in the power widow apparatus of FIG. 1.

As shown in FIG. 1, the power window apparatus 1 includes a switch unit 11 and a motor controller 12, which has a waterproof structure. As shown in FIGS. 1 and 2, the switch unit 11 includes a board 25, an operation switch 10 connected to the board 25, and a connector 13 mounted on the board 25. As shown in FIGS. 1 to 3, the switch unit 11 and the motor controller 12 are connected by a wire harness 14 via the connector 13.

Figure 4:
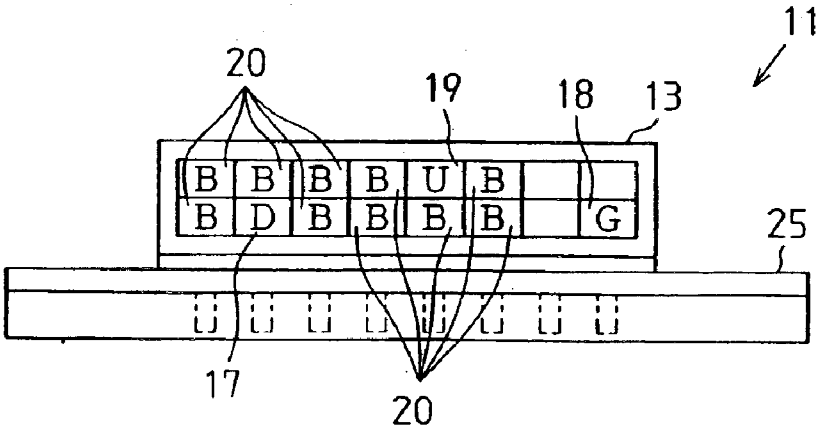
FIG. 4 is a diagram showing the arrangement of terminals of a connector included in the power window apparatus of FIG. 1 (as viewed in the direction of arrow A in FIG. 3)

As shown in FIG. 4, a down terminal 17, a ground terminal 18, an up terminal 19, and battery terminals 20 of the switch unit 11 are arranged in the connector 13.

The operation switch 10 includes a lowering switch 15 and a raising switch 16. The lowering switch 15 has a first terminal connected to the down terminal 17 and a second terminal connected to the ground terminal 18. The raising switch 16 has a first terminal connected to the up terminal 19, and a second terminal connected to the ground terminal 18. In the operation switch 10, either the lowering switch 15 or the raising switch 16 is closed by operating a button (not shown). The down terminal 17 connects to the ground terminal 18 via the closed lowering switch 15. The up terminal 19 connects to the ground terminal 18 via the closed raising switch 16.

In the switch unit 11, a power supply Vo (12V) is connected to the battery terminals (high-level terminals) 20. The switch unit 11 includes electronic components such as LEDs (not shown) connected to the battery terminals 20 and the ground terminal 18. The electronic components operate using power supplied from the power supply Vo. The high-level signals transmitted via the battery terminals 20 include high-level signals other than those signals having the same potential level as the power supply Vo described in the preferred embodiment. The ground terminal 18 of the switch unit 11 is grounded. When the lowering switch 15 is closed by operating the operation switch 10, the down terminal 17 is grounded via the closed lowering switch 15 and the ground terminal 18. When the raising switch 16 is closed by operating the operation switch 10, the up terminal 19 is grounded via the closed raising switch 16 and the ground terminal 18.

As described above, the switch unit 11 is connected to the motor controller 12 via the wire harness 14. In more detail, the down terminal 17 and the up terminal 19 of the switch unit 11 are respectively connected to a down terminal 21 and an up terminal 22 of the motor controller 12 via a cable of the wire harness 14.

The motor controller 12 includes a microcomputer (control unit) 23, a motor M, and a driver circuit 24. The motor M functions as an actuator for raising or lowering the window glass. The driver circuit 24 drives the motor M according to an instruction given by the microcomputer 23. The down terminal 21 and the up terminal 22 are electrically connected to the microcomputer 23.

In the motor controller 12, a pull-up resistor R1 is connected between the down terminal 21 and a power supply Vo, and a pull-up resistor R2 is connected between the up terminal 22 and the power supply Vo. When the lowering switch 15 is in an opened state, the potential of the down terminal 21 of the motor controller 12 is at the level of the power supply Vo (high-level). The microcomputer 23 detects that the lowering switch 15 is in an opened state based on the high-level potential at the down terminal 21. When the raising switch 16 is in an opened state, the potential of the up terminal 22 of the motor controller 12 is at the level of the power supply Vo (high-level). The microcomputer 23 detects that the raising switch 16 is in an opened state based on the high-level potential at the up terminal 22.

The microcomputer 23 actuates the driver circuit 24 according to input signals V1 and V2. In more detail, the microcomputer 23 actuates the driver circuit 24 to rotate the motor M clockwise when the potential level at the down terminal 21 is less than or equal to an actuation threshold Von. The microcomputer 23 does not actuate the driver circuit 24 when the potential level at the down terminal 21 is greater than or equal to a non-actuation threshold Voff (non-actuation threshold Voff>actuation threshold Von: see FIG. 5). In the same manner, the microcomputer 23 actuates the driver circuit 24 to rotate the motor M counterclockwise when the potential level at the up terminal 22 is less than or equal to the actuation threshold Von. The microcomputer 23 does not actuate the driver circuit 24 when the potential level at the up terminal 22 is greater than or equal to the non-actuation threshold Voff. In this way, the microcomputer 23 executes active-low control over the motor M according to the level of the input signals V1 and V2.

The connector 13 mounted on the board 25 is a right angle connector. Angle portions 26 of the terminals of the connector 13 are exposed on the board 25. In the preferred embodiment, at least an angle portion 26*a* of the ground terminal 18, among the angle portions 26 of all the terminals, is covered by a terminal cover 27 as shown in FIGS. 2 and 3. As one example, the terminal cover 27 is made of resin (insulating member), and is integrally formed with the connector 13 by insert molding.

FIG. 4 is a diagram showing the arrangement of the terminals of the connector 13 (as viewed in the direction of arrow A in FIG. 3). As shown in FIG. 4, the up terminal 19 is arranged in the upper-row terminal group, and the down terminal 17 is arranged in the lower-row terminal group. The down terminal 17 is surrounded by battery terminals 20 (high-level terminals) arranged on both sides of, and above, the down terminal 17. The up terminal 19 is surrounded by battery terminals 20 arranged on both sides of, and under, the up terminal 19. In the lower-row terminal group, the ground terminal 18 is arranged in a corner of the connector 13. The distance between the down terminal 17 and the ground terminal 18 is longer than the distance between the down terminal 17 and the battery terminals 20.

Figure 5:
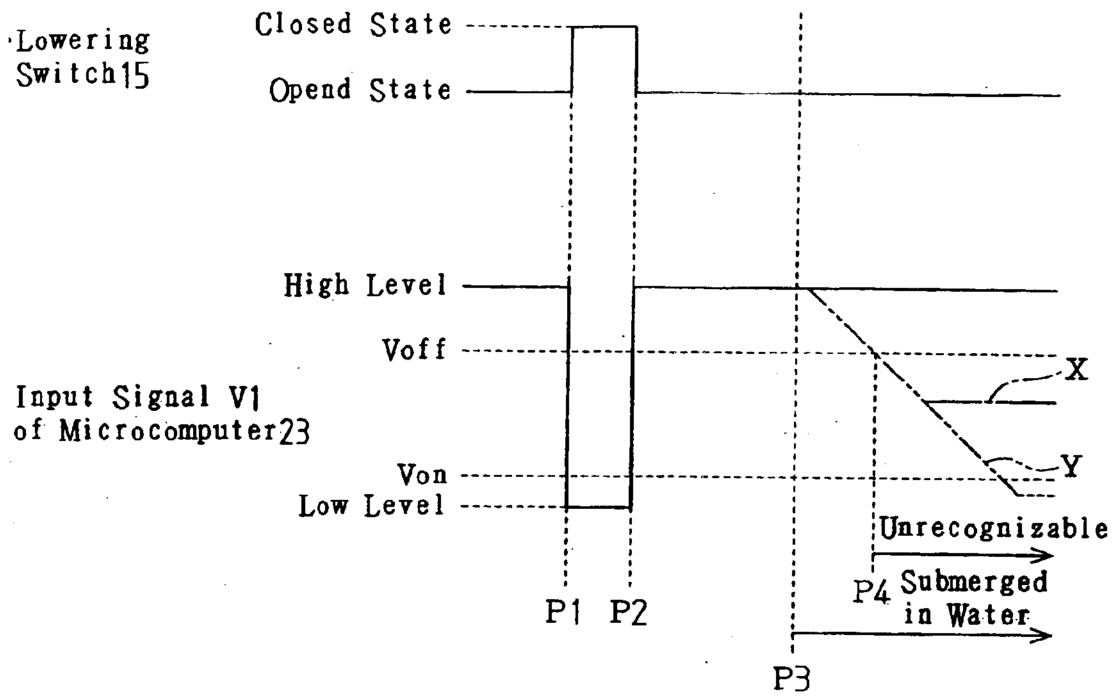
FIG. 5 is a graph explaining the operation of the power window apparatus of FIG. 1.

The following describes a case in which the vehicle having the power window apparatus 1 with the above-described structure is, for example, submerged in water and water enters between the connector 13 and the board 25, with reference to FIGS. 1 and 5. The lowering switch 15 and the raising switch 16 have the same structure, with the only difference being in the control executed by the microcomputer 23 (to raise or lower the window glass). The following only describes a case in which the operation switch 10 is operated to lower the window glass.

When the vehicle is not submerged in water, the input signal V1 of the microcomputer 23 is normally held at a high-level. As shown in FIG. 5, when the lowering switch 15 is closed by operating the operation switch 10 at the timing indicated by point P1, the input signal V1 shifts to a low-level. The microcomputer 23 actuates the motor M according to the low-level input signal V1. When the lowering switch 15 is then opened by stopping the operation of the operation switch 10 at the timing indicated by point P2, the input signal V1 returns to the high-level. The microcomputer 23 stops the motor M according to the high-level input signal V1.

When the vehicle is submerged in water at the timing indicated by point P3, water enters into each terminal of the connector 13. As shown in FIGS. 2 and 3, the ground terminal 18 is insulated by the terminal cover 27. Thus, leakage current does not flow between the down terminal 17 and the ground terminal 18. The down terminal 17 is surrounded by the battery terminals 20, which have the same potential as that of the down terminal 17. Thus, a leakage current does not flow between the down terminal 17 and the battery terminals 20. Even at the time of water entry, therefore, the microcomputer 23 is provided with a high-level input signal V1 when the operation switch 10 is not operated. The microcomputer 23 determines that the lowering switch 15 is in an opened state, and does not actuate the motor M.

In a conventional power window apparatus, a leakage current flows between an input terminal for an input signal and a ground terminal at the time of water entry. According to the leakage resistance between the input terminal and the ground terminal, therefore, the level of the input signal V1 lowers as indicated by the dash-dot line X or the dash-dot-dot line Y in FIG. 5. When the level of the input signal V1 falls between the actuation threshold Von and the non-actuation threshold Voff as indicated by the dash-dot line X after the time indicated by point P4, the microcomputer 23 cannot recognize an opened or closed state of the lowering switch 15. When the level of the input signal V1 is below the actuation threshold Von as indicated by the dash-dot-dot line Y, the microcomputer 23 incorrectly recognizes that the lowering switch 15 is in a closed state although the lowering switch 15 is actually in an opened state.

The following describes a case in which the operation switch 10 is operated at the time of water entry. Assuming that the lowering switch 15 is closed by operating the operation switch 10 at the time of water entry, the on-resistance of the lowering switch 15 is far smaller than the resistance of the leakage resistor RL2. Thus, the potential of the down terminal 17 shifts to low-level. To be more specific, the microcomputer 23 is provided with a low-level (the same level as when water does not enter into the terminals of the connector 13) input signal V1 via the down terminal 21. The microcomputer 23 determines that the lowering switch 15 is in a closed state based on the low-level input signal V1. The microcomputer 23 actuates the motor M to lower the window glass.

The power window apparatus 1 of the preferred embodiment has the advantages described below.

(1) The battery terminals 20, which are connected to the power supply Vo, are arranged on both sides of, and above, the down terminal 17 to surround the down terminal 17. The battery terminals 20, which are connected to the power supply Vo, are arranged on both sides of, and under, the up terminal 19 to surround the up terminal 19. Even if, for example, the vehicle is submerged in water and water enters into the angle portions 26 of the connector 13, therefore, a leakage current does not flow between the down terminal 17 and the battery terminals 20, and between the up terminal 19 and the battery terminals 20. Thus, the input signals V1 and V2 are maintained at a high-level. With the input signals V1 and V2 held at a high-level, the microcomputer 23 does not actuate the motor M. In this way, this structure prevents the microcomputer 23 from incorrectly recognizing that the lowering switch 15 or the raising switch 16 is in a closed state even when the power window apparatus 1 is submerged in water.

(2) The angle portion 26*a* of the ground terminal 18 is covered by the terminal cover 27. Therefore, even if, for example, the vehicle is submerged in water and water enters into the angle portions 26 of the connector 13, leakage current does not flow between the down terminal 17 and the ground terminal 18 and between the up terminal 19 and the ground terminal 18. Thus, the input signals V1 and V2 of the down terminal 17 and the up terminal 19 are maintained at the high-level. The microcomputer 23 does not actuate the motor M. In this way, this structure prevents the microcomputer 23 from incorrectly recognizing that the lowering switch 15 or the raising switch 16 is in a closed state even when the power window apparatus 1 is submerged in water.

(3) The terminal cover 27 is made of resin, and is integrally formed with the connector 13. Thus, the manufacturing cost of the power window apparatus 1 is reduced.

(4) The total surface area of the battery terminals 20 is larger than the surface area of the down terminal 17 and the up terminal 19 and, greater than the surface area of the ground terminal 18. Therefore, even if, for example, the vehicle is submerged in water and water enters into the angle portions 26 of the connector 13, leakage current is further unlikely to flow between the down terminal 17 and the battery terminals 20 and between the up terminal 19 and the battery terminals 20. Thus, the input signals V1 and V2 of the down terminal 17 and the up terminal 19 are likely to be maintained at high-level. This structure prevents the microcomputer 23 from incorrectly recognizing that the lowering switch 15 or the raising switch 16 is in a closed state even when the power window apparatus 1 is submerged in water.

(5) The microcomputer 23 executes active-low control over the driver circuit 24. When, for example, a range in which the microcomputer 23 determines that the input signals V1 and V2 are at high-level is relatively large (i.e., when the non-actuation threshold Voff is set relatively low), the resistance of the pull-up resistors R1 and R2 may be increased. When the resistance of the pull-up resistors R1 and R2 is increased, the amount of current flowing through the operation switch 10 is reduced. This enables inexpensive contacts (e.g., carbon contacts) to be used in the terminals of the operation switch 10. The manufacturing cost of the power window apparatus 1 is reduced.

It should be apparent to those skilled in the art that the present invention may be embodied in many other specific forms without departing from the spirit or scope of the invention. Particularly, it should be understood that the present invention may be embodied in the following forms.

Figure 6:
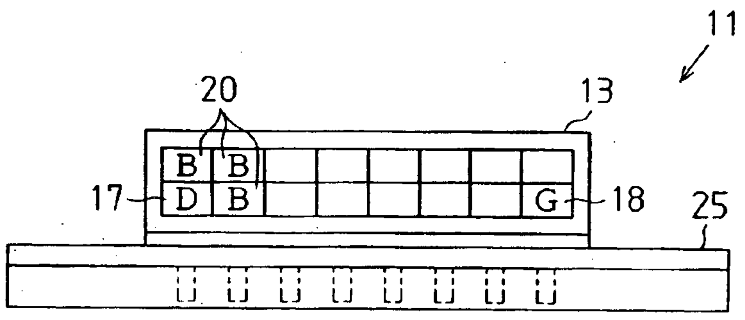
FIG. 6 is a diagram showing the arrangement of terminals of a connector included in a power window apparatus according to another embodiment of the present invention.

In the preferred embodiment, the down terminal 17 is surrounded by the battery terminals 20 arranged on both sides of, and under, the down terminal 17. The arrangement of the down terminal 17 and the battery terminals 20 should not be limited to such arrangement. For example, as shown in FIG. 6, the down terminal 17 may be arranged in a corner of the terminal group, that is, in a corner of the connector 13, and the battery terminals 20 may be arranged to surround this down terminal 17. This arrangement reduces the number of battery terminals 20 required to surround the down terminal 17.

The number of battery terminals 20 included in the connector 13 may be increased. With a larger number of battery terminals 20, a leakage current is further unlikely to flow between the down terminal 17 and the battery terminals 20. The up terminal 19 may be arranged in a corner of the terminal group, and the BATTETY terminals 20 may be arranged to surround this up terminal 19.

Figure 7:
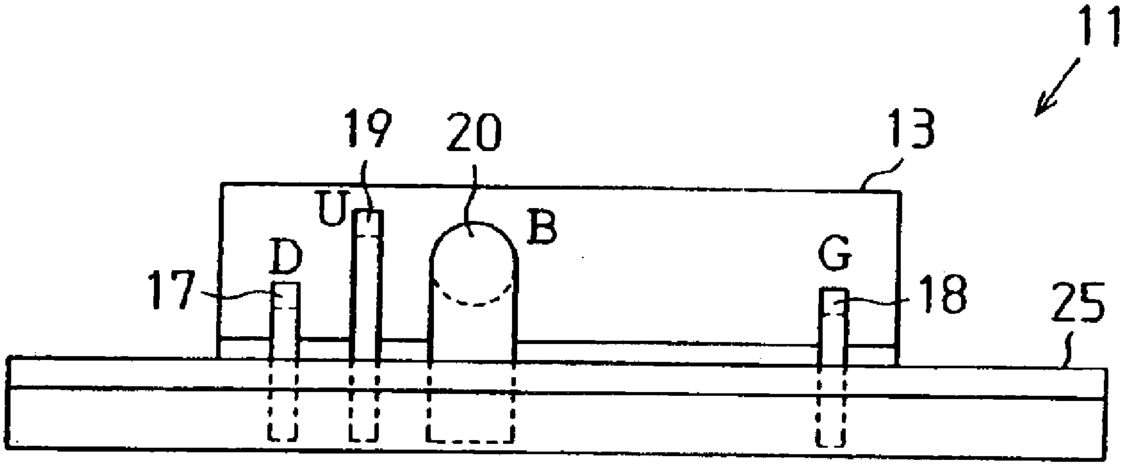
FIG. 7 is a diagram showing the arrangement of terminals of a connector included in a power window apparatus according to a further embodiment of the present invention.

As shown in FIG. 7, the battery terminal 20 having a larger surface area than the down terminal 17, or than the up terminal 19, may be arranged in the vicinity of the down terminal 17 and the up terminal 19. With the battery terminal 20 having such a larger surface area, a leakage current is further unlikely to flow between the down terminal 17 and the battery terminal 20, and between the up terminal 19 and the battery terminal 20.

In the preferred embodiment, the terminal cover 27 is formed integrally with the connector 13 by, for example, performing insert molding. However, the terminal cover 27 may not be formed when the connector 13 is formed. For example, the terminal cover 27 may be formed by covering the angle portion 26*a* of the ground terminal 18 with potting resin (e.g., epoxy resin) after the connector 13 is mounted on the board 25.

In the preferred embodiment, the angle portion 26*a* of the ground terminal 18 is covered by the terminal cover 27. However, the angle portion 26*a* of the ground terminal 18 may not be covered by the terminal cover 27. In this structure without the terminal cover 27, the battery terminals 20 are arranged between the down terminal 17 and the ground terminal 18, and between the up terminal 19 and the ground terminal 18, in a manner that the battery terminals 20 are away from the ground terminal 18. With such battery terminals 20 being connected to the power supply Vo, a potential substantially the same as the potential of the power supply Vo is generated around the battery terminals 20 when water enters into the angle portions 26 of the connector 13. The potential generated in this way inhibits a leakage current from flowing between the down terminal 17 and the ground terminal 18, and between the up terminal 19 and the ground terminal 18. The input signals V1 and V2 of the down terminal 17 and the up terminal 19 are likely to be maintained at a high-level. This structure prevents the microcomputer 23 from incorrectly recognizing that the lowering switch 15 or the raising switch 16 is in a closed state even when the power window apparatus 1 is submerged in water.

The angle portion 26*a* of the ground terminal 18 may not be covered by the terminal cover 27, but the angle portion of the down terminal 17 and the angle portion of the up terminal 19 may be covered by the terminal covers 27. Further, the angle portion 26*a* of the ground terminal 18, the angle portion of the down terminal 17, and the angle portion of the up terminal 19 may be covered by the terminal covers 27.

In the preferred embodiment, the connector 13 includes the battery terminals 20. However, the connector 13 may not include the battery terminals 20. Even when the connector 13 does not include the battery terminals 20, a leakage current does not flow between the down terminal 17 and the ground terminal 18, and between the up terminal 19 and the ground terminal 18 as long as the angle portion 26*a* of the ground terminal 18 is covered by the terminal cover 27.

In the preferred embodiment, the switch unit 11 includes one connector 13. However, the switch unit 11 may include two connectors, namely, a first connector including the ground terminal 18, and a second connector including the down terminal 17, the up terminal 19, and the battery terminals 20. This structure ensures that the input signals V1 and V2 are maintained at a high-level even when the power window apparatus 1 is submerged in water.

The present examples and embodiments are to be considered as illustrative and not restrictive, and the invention is not to be limited to the details given herein, but may be modified within the scope and equivalence of the appended claims.

What is claimed is:

1. A power window apparatus for moving a window glass of a vehicle by driving an actuator, the power window apparatus comprising:

a switch operated to cause the window glass to move;

a control unit for controlling the actuator;

a connector having a connecting terminal connecting the switch and the control unit, wherein the connector has a ground terminal used to connect the switch to ground, the switch connects the connecting terminal and the ground terminal to each other and generates a switch signal having a ground level at the connecting terminal when the switch is operated, and the control unit drives the actuator in response to the switch signal having the ground level; and an inhibiting means, arranged in the connector, for inhibiting leakage current from flowing between the connecting terminal and the ground terminal when the connector is submerged in water.

2. The power window apparatus according to claim 1, wherein the inhibiting means includes a terminal cover that covers at least one of the connecting terminal and the ground terminal and that is made from an insulative material.

3. The power window apparatus according to claim 2, wherein the terminal cover is made of potting resin.

4. The power window apparatus according to claim 2, wherein the connector and the terminal cover are made of resin and are integrally formed.

5. The power window apparatus according to claim 1, wherein the connecting terminal is provided with a signal having a power supply voltage when the switch is not operated, and the inhibiting means includes a power supply terminal that is arranged between the connecting terminal and the ground terminal and set at the power supply voltage.

6. The power window apparatus according to claim 5, wherein the power supply terminal and the connecting terminal each have a surface area, with the surface area of the power supply terminal being larger than the surface area of the connecting terminal.

7. The power window apparatus according to claim 5, wherein the power supply terminal is one of a plurality of power supply terminals surrounding the connecting terminal.

8. The power window apparatus according to claim 7, wherein the plurality of power supply terminals are arranged on both sides of, and over, the connecting terminal or on both sides of, and under, the connecting terminal.

9. The power window apparatus according to claim 5, wherein a distance between the connecting terminal and the ground terminal is longer than a distance between the connecting terminal and the power supply terminal.

10. The power window apparatus according to claim 9, wherein the connector has a first corner, and a second corner separated from the first corner, and the ground terminal is arranged in the first corner and the connecting terminal is arranged in the second corner.

11. A power window apparatus for moving a window glass of a vehicle by driving an actuator, wherein the power window apparatus is connected to a power supply, the power window apparatus comprising:

a switch operated for generating a switch signal to cause the window glass to move;

a control unit for controlling the actuator, wherein the control unit includes an input terminal that is provided with the switch signal;

a resistor connected between the power supply and the input terminal of the control unit; and a connector having a connecting terminal connecting the switch and the input terminal of the control unit, wherein the connector has a ground terminal used to connect the switch to ground, the switch connects the connecting terminal and the ground terminal to each other and generates a switch signal having a ground level at the connecting terminal when the switch is operated, and the control unit drives the actuator in response to the switch signal having the ground level, wherein the connector includes a power supply terminal connected to the power supply and arranged between the connecting terminal and the ground terminal.

12. The power window apparatus according to claim 11, wherein the connector includes a terminal cover that covers the ground terminal and is made from an insulative material.

13. The power window apparatus according to claim 12, wherein the terminal cover is made of potting resin.

14. The power window apparatus according to claim 12, wherein the connector and the terminal cover are made of resin and are integrally formed.

15. The power window apparatus according to claim 11, wherein the power supply terminal and the connecting terminal each have a surface area, with the surface area of the power supply terminal being larger than the surface area of the connecting terminal.

16. The power window apparatus according to claim 11, wherein the power supply terminal is one of a plurality of power supply terminals surrounding the connecting terminal.

17. The power window apparatus according to claim 16, wherein the plurality of power supply terminals are arranged on both sides of, and over, the connecting terminal or on both sides of, and under, the connecting terminal.

18. The power window apparatus according to claim 11, wherein a distance between the connecting terminal and the ground terminal is longer than a distance between the connecting terminal and the power supply terminal.

19. The power window apparatus according to claim 18, wherein the connector has a first corner, and a second corner separated from the first corner, and the ground terminal is arranged in the first corner and the connecting terminal is arranged in the second corner.

* * * * *